United States Patent
Pluschke et al.

(10) Patent No.: US 6,250,416 B1
(45) Date of Patent: Jun. 26, 2001

(54) HYDRAULIC POWER STEERING WITH A CLOSED CENTER

(75) Inventors: Albrecht Pluschke, Winnenden; Thomas Stehli, Aichtal, both of (DE)

(73) Assignee: Meredes-Benz Lenkungen GmbH, Duesseldorf (DE)

( * ) Notice: Subject to any disclaimer, the term of this patent is extended or adjusted under 35 U.S.C. 154(b) by 0 days.

(21) Appl. No.: 09/463,744
(22) PCT Filed: Jul. 22, 1998
(86) PCT No.: PCT/EP98/04598
  § 371 Date: Aug. 9, 2000
  § 102(e) Date: Aug. 9, 2000
(87) PCT Pub. No.: WO99/06262
  PCT Pub. Date: Feb. 11, 1999

(30) Foreign Application Priority Data

Jul. 31, 1997 (DE) .............................................. 197 33 032

(51) Int. Cl.⁷ ................................. B62D 5/00; B62D 5/06
(52) U.S. Cl. ............................................. 180/404; 180/417
(58) Field of Search ................................... 180/403, 404, 180/405, 417, 421–423

(56) References Cited

U.S. PATENT DOCUMENTS

| 4,562,710 |   | 1/1986 | Lipschutz ............................... 70/252 |
| 5,048,627 | * | 9/1991 | Eguchi et al. ........................ 180/404 |
| 5,449,186 | * | 9/1995 | Gerl et al. ............................. 180/404 |
| 5,553,683 |   | 9/1996 | Wenzel et al. ....................... 180/417 |
| 6,012,541 | * | 1/2000 | Nishioka et al. .................... 180/404 |
| 6,018,691 | * | 1/2000 | Yamamoto et al. ................. 180/404 |

FOREIGN PATENT DOCUMENTS

| 195 19 875 | 10/1995 | (DE) . |
| 196 41 899 | 7/1996 | (DE) . |

* cited by examiner

Primary Examiner—Brian L. Johnson
Assistant Examiner—Matthew Luby
(74) Attorney, Agent, or Firm—Crowell & Moring, L.L.P.

(57) ABSTRACT

A closed-center hydraulic power steering system includes a rechargeable hydraulic pressure accumulator being capable of being connected to a servomotor via controllable pressure-reducing valves which control the motor pressure according to a desired value predetermined by a control device, a connection also being made, if required, between the motor and a relatively pressureless reservoir.

7 Claims, 3 Drawing Sheets

HYDRAULIC POWER STEERING WITH A CLOSED CENTER

The invention relates to a hydraulic power steering system with
- a steering wheel, also
- steerable vehicle wheels positively coupled to the latter for steering adjustment, and
- a double-acting hydrostatic servomotor positively coupled to the steerable vehicle wheels and/or the steering wheel,
- a hydraulic pressure-generating device,
- a relatively pressureless hydraulic reservoir,
- a control-valve arrangement which has two parallel three-way pressure-reducing valves assigned in each case to one side or connecting line of the servomotor and which makes it possible to connect both sides of the servomotor to the hydraulic reservoir and, in each case, one side of the servomotor to the pressure-generating device,
- a sensor for detecting forces or movements transmitted between the steering wheel and the steerable vehicle wheels, and also
- an electronic control device which is connected, on the input side, to the sensor and which controls the control-valve arrangement as a function of the forces or moments transmitted between the steering wheel and steerable vehicle wheels, in such a way that the servomotor generates a boosting force in order to reduce a manual force perceptible on the steering wheel.

BACKGROUND

A power steering system of this type is known from U.S. Pat. No. 5 553 683. This known power steering system possesses three valves, the opening state of which is controlled by an electronic control by means of pulse-width modulation. In this case, the opening and closing behaviour of the valves is controlled directly, and incorrect settings of the boosting force may occur at least temporarily.

According to the periodical O +P "Ölhydraulik und Pneumatik" ["Oil Hydraulics and Pneumatics"] 40 (1996) No. 6, page 409, closed-center hydraulic power steering systems are known, a high peak power being available if a hydraulic pressure accumulator arranged as a pressure source is dimensioned appropriately. It is advantageous, furthermore, that the hydraulic steering system consumes energy only when a steering adjustment of the steerable vehicle wheels is assisted by a boosting force. By contrast, in the case of a steady-state steering situation without any manual force, no hydraulic energy is required.

In a power steering system known from EP-A 0 427 029, the control-valve arrangement is formed by proportionally working control valves which are urged by spring force into a position connecting the respective side of the servomotor to the hydraulic reservoir and by a controllable electromagnet, counter to the spring force, into a position connecting the respective side of the servomotor to the pressure accumulator.

It is known from U.S. Pat. No. 4,562,710 to provide hydraulic blocking of the servomotor of a power steering system as an immobilizer.

In power steering systems of the type specified in the introduction, a sensitive control of the boosting force may present difficulties.

SUMMARY OF THE INVENTION

The object of the invention is, in a steering system of the type specified in the introduction, to make it possible to improve the control of the boosting force.

This object is achieved, according to the invention, in that
- the pressure-generating device has a hydraulic pressure accumulator,
- the three-way pressure-reducing valves are provided with a controllable motor-pressure desired value, and
- the control-valve arrangement is controlled by controlling the motor-pressure desired values of the pressure-reducing valves.

The invention is based on the general concept of actuating the control-valve arrangement indirectly by means of the electronic control device, in that only the desired value of a motor pressure to be set at the respective motor connection is predetermined and the valve arrangement otherwise works automatically as a function of the desired/actual-value deviation of the pressure at the respective motor connection. The control device thus acts as a desired-value generator working as a function of parameters.

In the invention, it is advantageous that the respective motor-pressure desired values also constitute a measure of the desired value of the boosting force to be set in each case, that is to say the pressure-reducing valves work automatically as a function of the desired/actual-value deviation of the boosting force.

This, on the one hand, ensures that the boosting force is controlled without any delay and as required and, on the other hand, means that no "overreactions" in the control of the boosting forces are to be expected, even in the event of a rapid change in the operating conditions.

A particular benefit of the invention is that no hydraulic control members having seals subject to friction have to be arranged in or on the mechanical drive train or in or on the positive connection between the steering wheel or steering wheel and the vehicle wheels steered thereby. The invention accordingly ensures a steering system with low hysteresis in steering manoeuvres with successive steering changes.

Moreover, as regards preferred features of the invention, reference is made to the claims and to the following explanation of the drawing, by means of which particularly preferred embodiments are described.

DETAILED DESCRIPTION

Figure 1:
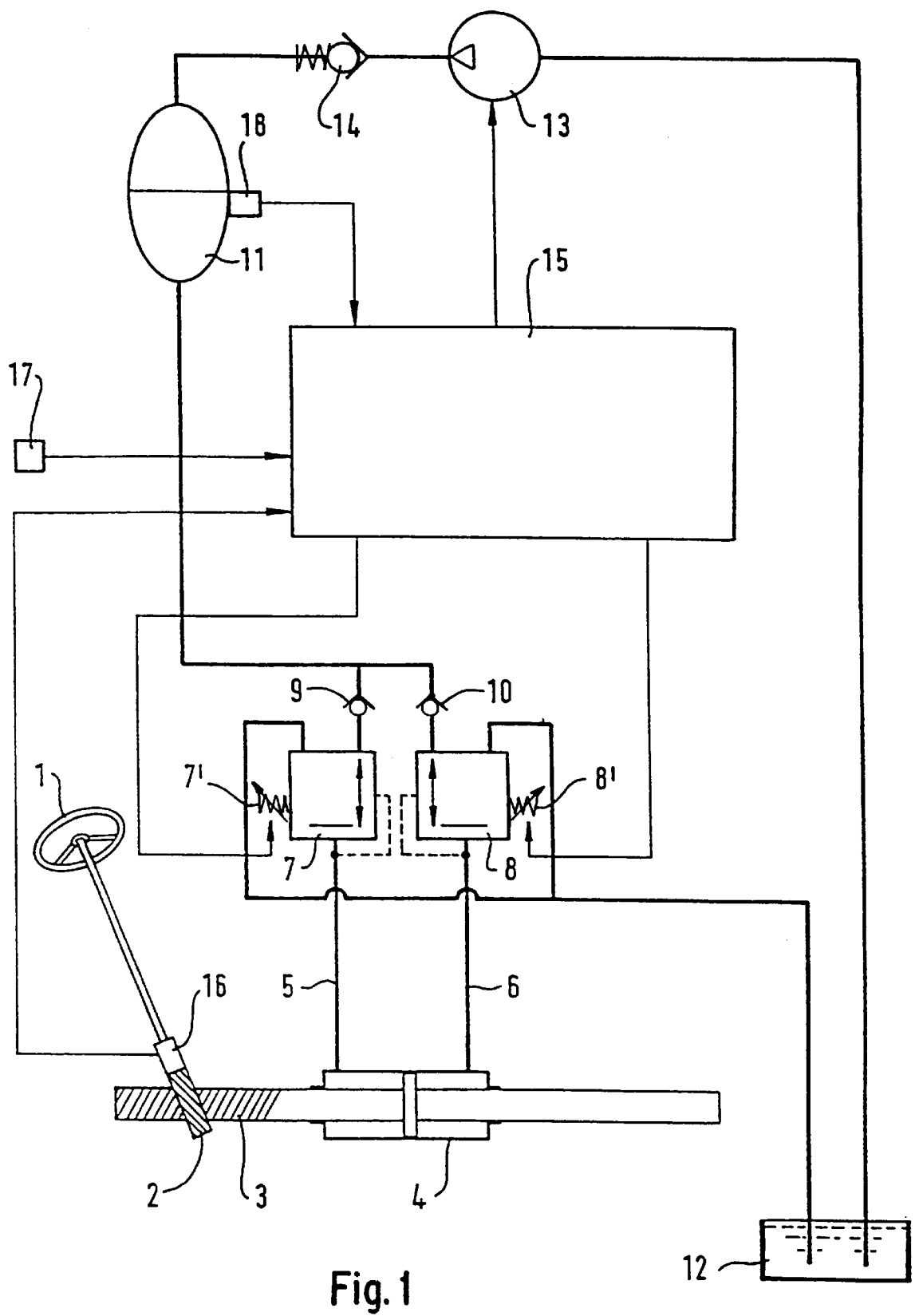
FIG. 1 shows a general illustration of the steering system according to the invention in the manner of a circuit diagram.

According to FIG. 1, a motor vehicle, not illustrated in any more detail, possesses a steering wheel 1 which is positively coupled mechanically to steerable vehicle wheels, not illustrated in any more detail, for the steering adjustment of these and which, in the example illustrated, is drive-coupled, via a pinion 2, to a rack 3, the movements of which are transmitted via track rods, not illustrated, to the above-mentioned steerable vehicle wheels.

The rack 3 forms part of a piston rod of a double-acting hydraulic piston/cylinder assembly 4, the two sides of which are connected in each case separately via connecting lines 5 and 6, in each case to a pressure-reducing valve 7 and 8. Each of these is a pressure-reducing valve with relief, that is to say the pressure-reducing valves 7 and 8 can connect the respective side of the piston/cylinder assembly 4, on the one hand, via intermediate non-return valves 9 and 10, to a hydraulic pressure accumulator 11 or to a relatively pressureless hydraulic reservoir 12 or can shut off the said side both relative to the pressure accumulator 11 and relative to the hydraulic reservoir 12.

The pressure-reducing valves 7 and 8 are controllable in terms of their pressure desired value, as explained in more detail further below.

The pressure accumulator 11 can be charged or constantly maintained at a high accumulator pressure of, for example, 120 bar by a pump 13 connected on the suction side to the hydraulic reservoir 12, pressure relief of the pressure accumulator 11 via the pump 13 towards the reservoir 12 being prevented by a non-return valve 14.

A computer-assisted electronic control unit 15 is connected, on the input side, to a torque sensor 16 which detects the manual force to be applied on the steering handwheel 1 and, in the illustrated example of rack-and-pinion steering, is arranged between the steering wheel 1 and the pinion 2.

Furthermore, the control unit 15 may be connected, on the input side, to various additional sensors, for example to a sensor 17 for the travelling speed of the vehicle.

Moreover, the input side of the control unit 15 is connected to a pressure sensor 18 which detects the accumulator pressure of the pressure accumulator 11.

On the output side, the control unit 15 is connected, on the one hand, to control members 7' and 8' of the pressure-reducing valves 7 and 8 for controlling the respective pressure desired value at the connecting lines 5 and 6 or on the two sides of the piston/cylinder assembly 4.

Moreover, the output side of the control unit 15 controls a drive, not illustrated in any more detail, for example an electric motor for the pump 13.

The arrangement illustrated in FIG. 1 functions as follows:

The piston/cylinder assembly 4 acting as a hydraulic servomotor is to generate, in each case, a boosting force which is dependent on the manual force on the steering wheel 1, increases with increasing manual force and decreases with decreasing manual force and assists the respective steering manoeuvre, and the magnitude of which is controlled, where appropriate as a function of parameters, in particular as a function of the travelling speed detected by the sensor 17. If, for example, the steering wheel 1 is urged by the driver into a direction of rotation which corresponds, in FIG. 1, to a displacement of the rack 3 to the right, and if, at the same time, the manual force reaches an excessive value which is "communicated" to the control unit 15 by the torque sensor 16, then the control unit 15 will set the pressure desired value at the pressure-reducing valve 7 to a relatively high value, whilst the pressure desired value at the pressure-reducing valve 8 is set to a low value or remains at a low value normally set. As a result, the pressure desired value at the pressure-reducing valve 7 will therefore exceed the pressure actual value at the connecting line 6 or on that side of the piston/cylinder assembly 4 which is on the right in FIG. 1, whilst the pressure desired value at the pressure-reducing valve 8 falls below the actual value at the connecting line 6 or on the left-hand side of the piston/cylinder assembly 4. The pressure-reducing valve 7 consequently makes a connection between the left-hand side of the piston/cylinder assembly 4 and the pressure accumulator 11 which is regularly recharged by the pump 13 being switched on by the control unit 15, as soon as the pressure sensor 18 signals a fall below a high pressure threshold value. By contrast, the right-hand side of the piston/cylinder assembly 4 is connected to the reservoir 12. As a result, a pressure difference takes effect at the piston/cylinder assembly 4 and seeks to urge the rack 3 to the right in FIG. 1. As soon as the actual/desired-value deviation at the pressure-reducing valves 7 and 8 disappears, the respective pressure-reducing valve 7 or 8 assumes a closed position, in which the respectively connected side of the piston/cylinder assembly 4 or the respective connecting line 5 or 6 is shut off both relative to the pressure accumulator 11 and relative to the reservoir 12. In the event of any displacement of the rack 3 or of the piston of the piston/cylinder assembly 4, the desired/actual-value deviations at the pressure-reducing valves 7 and 8 necessarily change, as long as the set pressure desired values remain unchanged; correspondingly, the pressure-reducing valves 7 and 8 are adjusted for the purpose of reducing the respective desired/actual-value deviation Since the control unit 15 predetermines the pressure desired values at the pressure-reducing valves 7 and 8, the boosting force to be generated by the piston/cylinder assembly 4 is predetermined in terms of amount and direction, the pressure-reducing valves 7 and 8 then automatically executing the control strokes necessary for achieving or maintaining the respective boosting force.

So that the steerability of the vehicle can be ensured even if there are faults in the control unit 15, there is expediently provision, when electric control current for the control members 7' and 8' of the pressure-reducing valves 7 and 8 is switched off, for the said pressure-reducing valves to assume in each case their operating state for a minimum pressure desired value, with the result that both sides of the piston/cylinder assembly 4 then remain constantly connected to the hydraulic reservoir 12. If, in the event of a fault in the control unit 15, the control members 7' and 8' are automatically switched to currentless, the vehicle can therefore continue to be steered, albeit without power assistance.

The system according to the invention may, if appropriate, perform the function of an immobilizer. If the control unit 15 does not receive an "authorized driver" signal from a securing unit, not illustrated, before travel commences, the pressure desired values at the two pressure-reducing valves 7 and 8 are set simultaneously to a very high maximum value. The result of this is that the pressure-reducing valves 7 and 8 connect both sides of the piston/cylinder assembly 4 constantly to the pressure accumulator 11, displacement of hydraulic medium between the two sides of the piston/cylinder assembly 4 being prevented by the non-return valves 9 and 10 and the assembly 4 consequently being blocked hydraulically. The vehicle thus remains unsteerable.

Figure 2:
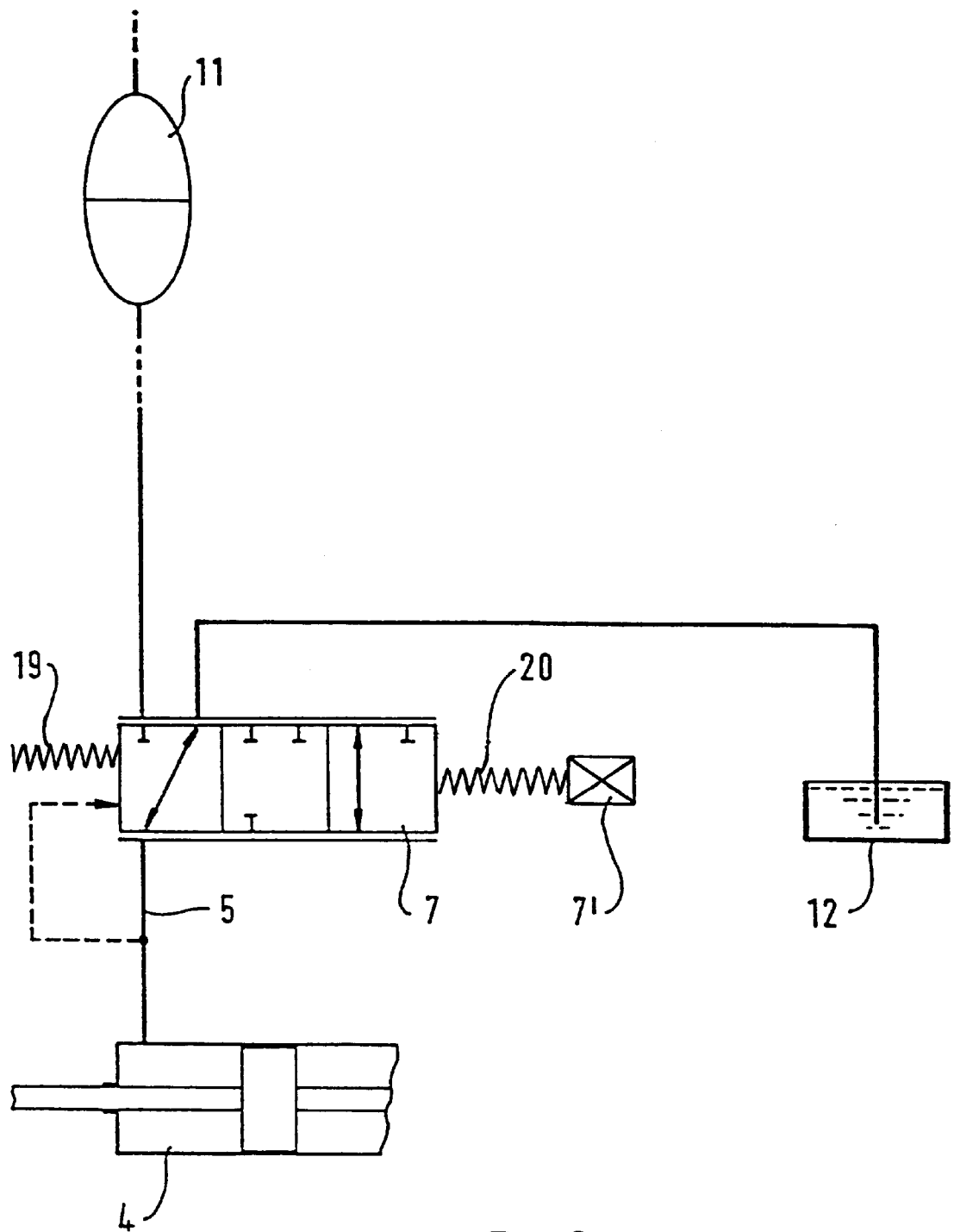
FIG. 2 shows a functional diagram for the pressure-reducing valves used in the invention.

FIG. 2 shows a more functional illustration of the pressure-reducing valves 7 and 8, only the pressure-reducing valve 7 being reproduced. In functional terms, this pressure-reducing valve 7 corresponds to a 3/3-way valve which can be changed over between a position in which the connecting line 5 is connected to the hydraulic reservoir 12, a position in which the connecting line 5 is shut off both relative to the pressure accumulator 11 and relative to the reservoir 12, and a position in which the connecting line 5 communicates with the pressure accumulator 11. The valve body, illustrated in the manner of a slide, is urged by the hydraulic pressure in the connecting line 5 and the force of a first spring 19 in the direction of the valve position connecting the connecting line 5 to the reservoir 12. A further spring 20, the spring tension of which is variable in a controlled manner by the control member 7', seeks to urge the valve body into its position connecting the connecting line 5 to the pressure accumulator 11. As a result, the respective valve position is consequently determined by the hydraulic pressure in the connecting line 5, on the one hand, and by the spring tension of the spring 20, on the other hand. When the pressure in the line 5 rises sufficiently in relation to the tension of the spring 20, the valve body is set into the position illustrated in FIG. 2. If the hydraulic pressure forces in the line 5 and also the spring tension of the spring 19, on the one hand, and the spring tension of the spring 20, on the other hand, are equalized, the valve assumes the middle shut-off position. If, by contrast, the spring forces of the spring 20 predominate, the valve assumes the position connecting the line 5 to the pressure accumulator 11.

Preferably, the control member 7' is designed to be free of self-locking, for example as an actuating magnet, so that, when the electrical control current for the control member 7' is switched off, relaxation of the spring 20 occurs, with the result that the spring 19 sets the valve body into the position illustrated in FIG. 2, irrespective of the hydraulic pressure in the connecting line 5.

Figure 3:
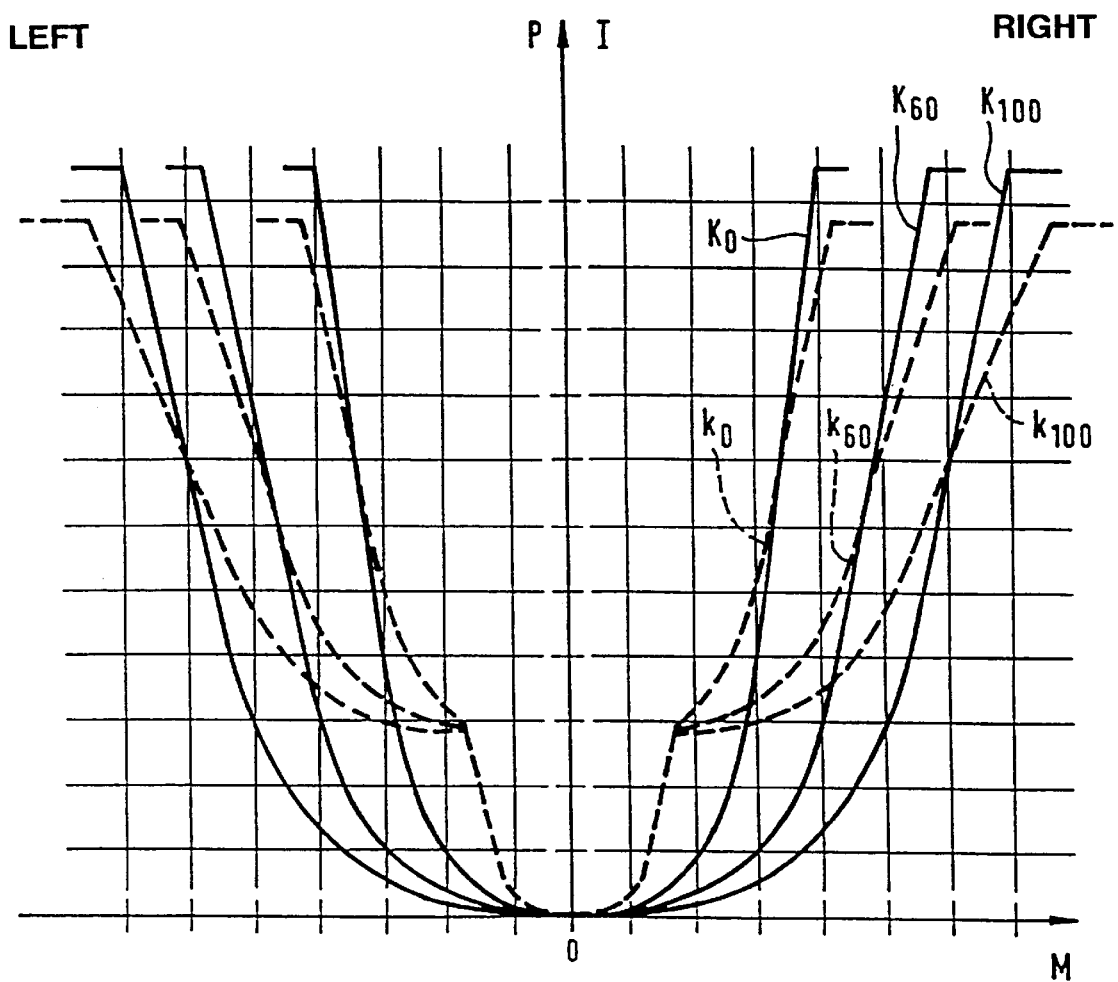
FIG. 3 shows a graph which illustrates, on the one hand, the dependence of the hydraulic boosting forces as a function of the manual force to be applied and, on the other hand, the electrical control current at the pressure-reducing valves as a function of the manual force.

FIG. 3 illustrates, on the one hand, the pressures P in each case on one side of the piston/cylinder assembly 4 as a function of the manual force M perceptible on the steering wheel 1. In this case, curve $K_0$ shows the ratios with the vehicle stationary (travelling speed =0 km/h), whilst the curves $K_{60}$ and $K_{100}$ reproduce the ratios for a travelling speed of 60 km/h and 100 km/h, respectively. If a manual force M in one direction is perceptible on the steering wheel 1, the pressure P on one side of the piston/cylinder assembly 4 (for example, on the right-hand side) is varied according to the curves $K_0$ to $K_{100}$, whilst the pressure on the other side of the piston/cylinder assembly 4 remains insignificantly low. In the case of a manual force in the opposite direction, the pressure on the other side of the piston/cylinder assembly 4 (for example, on the left-hand side) is controlled according to the abovementioned curves, whilst the pressure on the first side remains insignificantly low.

The curves $k_0$, $k_{60}$ and $k_{100}$ show in each case the electrical control currents at the control members 7' and 8'. In the case of very low manual forces M, there is no control current switched on. As soon as the manual force M exceeds a threshold amount in one direction or the other, the electrical control current at in each case one control member 7' or 8' is increased sharply in order to increase the pressure desired value at the respective pressure-reducing valve 7 or 8 with increasing amounts of the manual force M. When the amounts of manual force M increase even further, a control of the electrical currents which is similar to the curves $K_0$, $K_{60}$ and $K_{100}$ then takes place.

In contrast to the embodiment illustrated in the drawing, in which the hydrostatic servomotor 4 is designed as a piston/cylinder assembly, a rotary hydrostatic motor may also be provided. In the case of rack-and-pinion steering, a motor of this type may advantageously be arranged on or at the shaft of the pinion 2 and form part of a compact rack-and-pinion mechanism.

What is claimed is:
1. Hydraulic power steering system with a steering wheel (1), also steerable vehicle wheels positively coupled to the latter for steering adjustment, and a double-acting hydrostatic servomotor (4) positively coupled to the steerable vehicle wheels and/or the steering handle, a hydraulic pressure-generating device (11, 13), a relatively pressureless hydraulic reservoir (12), a control-valve arrangement (7, 8) which has two parallel three-way pressure-reducing valves (7, 8) assigned in each case to one side or connecting line (5, 6) of the servomotor (4) and which makes it possible to connect both sides of the servomotor (4) to the pressure-generating device (11, 13), a sensor (16) for detecting forces or moments transmitted between the steering wheel(1) and the steerable vehicle wheels, and also an electronic control device (15) which is connected, on the input side, to the sensor (16) and which controls the control-valve arrangement (7, 8) as a function of the forces or moments transmitted between the steering wheel (1) and the steerable vehicle wheels, in such a way that the servomotor (4) generates a boosting force in order to reduce a manual force perceptible on the steering wheel (1), characterized in that the pressure-generating device (11, 13) has a hydraulic pressure accumulator (11), the three-way pressure-reducing valves (7, 8) are provided with a controllable motor-pressure desired value, and the control-valve arrangement (7, 8) is controlled by controlling the motor-pressure desired values of the pressure-reducing valves (7, 8).

2. Hydraulic power steering system according to claim 1, characterized in that the pressure-reducing valves (7, 8) are designed as proportionally working valves.

3. Power steering system according to claim 1, characterized in that a non-return valve (9, 10), which prevents a return flow to the pressure accumulator (11), is arranged between each pressure-reducing valve (7, 8) and the pressure accumulator (11).

4. Power steering system according to claim 1, characterized in that the control device (15) permits to switch on an operating state which can be used as an immobilizer and in which the servomotor (4) is blocked hydraulically.

5. Power steering system according to claim 1, characterized in that the control device (15) predetermines desired values for the motor pressure which are varied as a function of parameters.

6. Power steering system according to claim 1, characterized in that each pressure-reducing valve (7, 8) is urged by a spring force (20) variable by means of the control device (15), counter to the pressure at a respective motor connection (5, 6), into a position connecting the pressure accumulator (11) to the motor connection (5, 6).

7. Power steering system according to claim 1, characterized in that the hydraulic pressure accumulator (11) is assigned an electrical charging pump (13) actuated by the control device (15).

* * * * *